United States Patent [19] [11] 4,405,559

Tokarz [45] Sep. 20, 1983

[54] COOLANT MONITORING APPARATUS FOR NUCLEAR REACTORS

[75] Inventor: Richard D. Tokarz, West Richland, Wash.

[73] Assignee: The United States of America as represented by the U.S. Department of Energy, Washington, D.C.

[21] Appl. No.: 290,289

[22] Filed: Aug. 6, 1981

[51] Int. Cl.³ .............................................. G21C 17/00
[52] U.S. Cl. .................................... 376/247; 376/246
[58] Field of Search ............... 376/245, 247, 246, 258; 73/299, 301

[56] References Cited

U.S. PATENT DOCUMENTS 3,561,406  2/1971  Rupprecht .......................... 376/247
3,913,401  10/1975  Sweeney ............................... 73/299
4,102,175  7/1978  Foster .................................. 376/247

FOREIGN PATENT DOCUMENTS 1105477  10/1965  United Kingdom ............... 376/247

Primary Examiner—Sal Cangialosi
Attorney, Agent, or Firm—Robert Southworth, III; Richard E. Constant; Richard G. Besha

[57] ABSTRACT

A system for monitoring coolant conditions within a pressurized vessel. A length of tubing extends outward from the vessel from an open end containing a first line restriction at the location to be monitored. The flowing fluid is cooled and condensed before passing through a second line restriction. Measurement of pressure drop at the second line restriction gives an indication of fluid condition at the first line restriction. Multiple lengths of tubing with open ends at incremental elevations can measure coolant level within the vessel.

6 Claims, 3 Drawing Figures

COOLANT MONITORING APPARATUS FOR NUCLEAR REACTORS

The United States Government has rights in this invention pursuant to DOE Contract DE-AC-06-76RL01830.

TECHNICAL FIELD

This disclosure relates to an apparatus for monitoring the presence of coolant in liquid or mixed liquids and gaseous phases at one or more locations within an operating nuclear reactor, either boiling water or pressurized water reactors. It further relates to a system which provides diserete measurement of the void fraction or percentage of gaseous phase material at the monitored location. It also relates to a system for measuring the temperatures of liquid or superheated vapors.

BACKGROUND ART

There exists a need for systems capable of detecting two-phase flow in the reactor coolant loop and for systems capable of detecting liquid level in the core and auxiliary vessels and piping of a nuclear reactor. United States governmental regulations specify "thermal hydraulic" measurement capabilities in all operating power reactors. These needs and requirements are the result of experience gained from a small break loss of coolant accident.

During such an "event" in a pressurized water reactor, there might be a period during which the reactor pressurizer will overfill with water while the primary pumps are operational. The reactor coolant will then remain in two-phase flow through the coolant loop and might have a significant void fraction. Because there is no instrumentation to indicate this condition, the reactor operator is unable to determine that a void fraction exists. As the pumps eventually begin to cavitate and are shut off, the void fraction in the coolant will separate, exposing a portion of the core. Because of the unavailability of liquid level monitoring systems for this contingency, the operators of the reactor might be unaware of these conditions until serious damage results to the core itself.

In a boiling water reactor the coolant in the core is in continuous two-phase flow in normal operation. There is presently no direct reading device which will indicate to the operator what the void fraction is at any particular elevation in the core. This is also true of liquid level readout.

The present system is designed to provide continuous monitoring of coolant conditions at one or more locations within an operating reactor vessel as well as peripheral piping and systems. It can be used to determine the coolant level at a particular location. It is also capable of measuring the void fraction or ratio of the gaseous phase to the liquid phase in the coolant at one or more monitored locations. In addition to these measurements the device will provide a discrete output which can be directly related to the coolant conditions from reactor startup to a finite point in fluid temperature and pressure where the sensor output assumes a different slope. From this point to the point where the fluid temperature and pressure reach "saturation" we choose to define as 'approach to void Fraction. These two points on the instrument output are determined by the orifice sizing in the sensor design. Void Fraction measurement then is represented by the instrument output from this latter point by a nearly linear drop in output reading to a third reading which represent 100% void fraction or a liquid level. This third point in the output reading is also determined by the sizing of the orifices in the instrument, assuming that the driving force "Pressure" is not a limiting factor.

DISCLOSURE OF THE INVENTION

The apparatus comprises a length of small diameter tubing having an open end positioned within the vessel at the location to be monitored.

This tube can represent an orifice in itself or an orifice can be included at the open end of the tube to provide a specific pressure drop related to the mass flow rate in the sensing system.

The tubing leads through the vessel wall to a cooling coil which condenses the vapor to liquid and then delivers the pressurized liquid to the sensing system at a specific temperature. This sensing system consists of a second orifice or restriction interposed between the condenser and a back pressure regulator, which causes a second pressure drop in the flowing coolant. A differential pressure sensor connected across this second restriction provides an analog signal that is a function of the pressure drop of the liquid coolant across this restriction. This pressure drop will differ in magnitude depending upon the phase condition and pressure of the fluid or fluids passing through the first orifice in the end of the tube within the vessel. The output signal will therefore be indicative of the fluid phase at the first orifice by changes in mass flow rate at the monitored location. It is understood that the device functions the same whether the fluid is a single fluid or two or more different fluids in liquid and or vapor state.

BEST MODE FOR CARRYING OUT THE INVENTION

Figure 1:
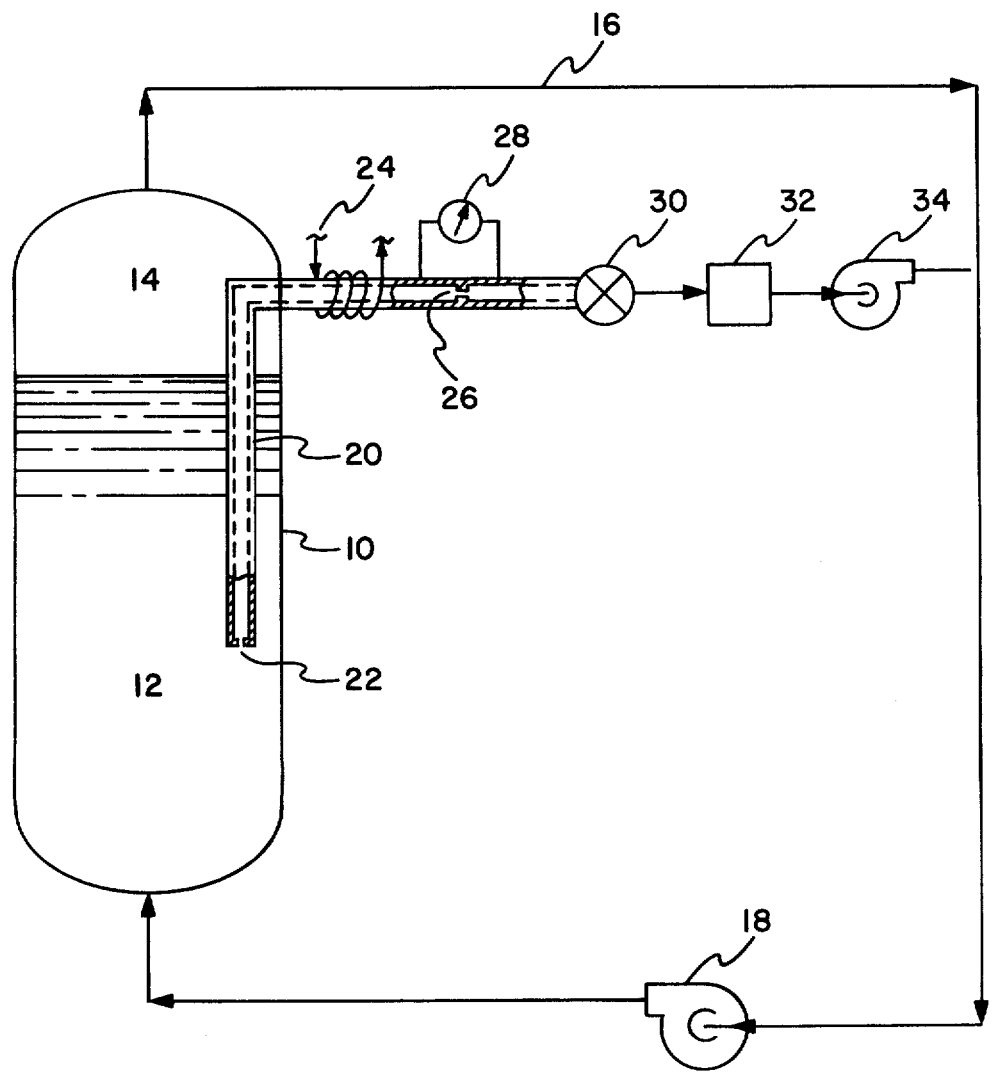
FIG. 1 Schematically illustrates the apparatus for monitoring coolant conditions.

Referring now to FIG. 1, which illustrates the present invention semidiagrammatically in use in a nuclear reactor, a reactor vessel 10 is seen. The reactor vessel 10 contains, in addition to the reactor core and other hardware not illustrated, a quantity of liquid water 12 and steam 14. Heat generated within the reactor is removed by circulating the water and steam through a coolant loop 16 by means of circulation pump 18. A length of small diameter metal tubing 20 situated within the pressurized vessel has a first orifice 22 at the sensing location where the condition of coolant is to be monitored. The tubing is brought out of the vessel to its exterior. This will be typically accomplished by a welded vessel penetration through a wall or pipe section. The portion of the tubing 20 exterior to the vessel 10 is shown as being cooled by a condenser coil 24 which cools the liquid and condenses and cools the vapor flowing through the length of tubing 20.

A second orifice 26 or restriction is interposed in the length of tubing 20 beyond the condenser section at a convenient location for monitoring purposes. The restrictions can be in the form of a venturi throat, a small diameter orifice, or any other form of restriction which will result in a pressure drop in the liquid material flowing through the length of tubing 20. A differential pressure sensor 28 having upstream and downstream pressure taps across which differential pressure of the flowing liquid can be sensed is used to sense pressure differential across the second orifice 26. The analog output that results at the sensor 28 can be connected to a suitable readout, as well as to appropriate annunciation devices for control room monitoring purposes.

After passing through the sensing orifice 28 the liquid flows through a back pressure regulator valve 30. The back pressure regulator 30 maintains the pressure at the downstream side of the restriction 26 at a preselected ratio to the pressure of the liquid coolant circulated within the reactor coolant loop, thereby maintaining a fixed pressure drop across the two orifices in the sensing system. Liquid is collected in reservoir 32 before being returned to coolant loop 16 by injection pump 34.

Although a single length of tubing 20 is illustrated, it is to be understood that the system will normally consist of a number of such tubes, each monitoring a different sensing location within the reactor vessel. Each tube may have its own pressure sensor or several tubes may be manifolded to use a single pressure sensor.

Figure 2:
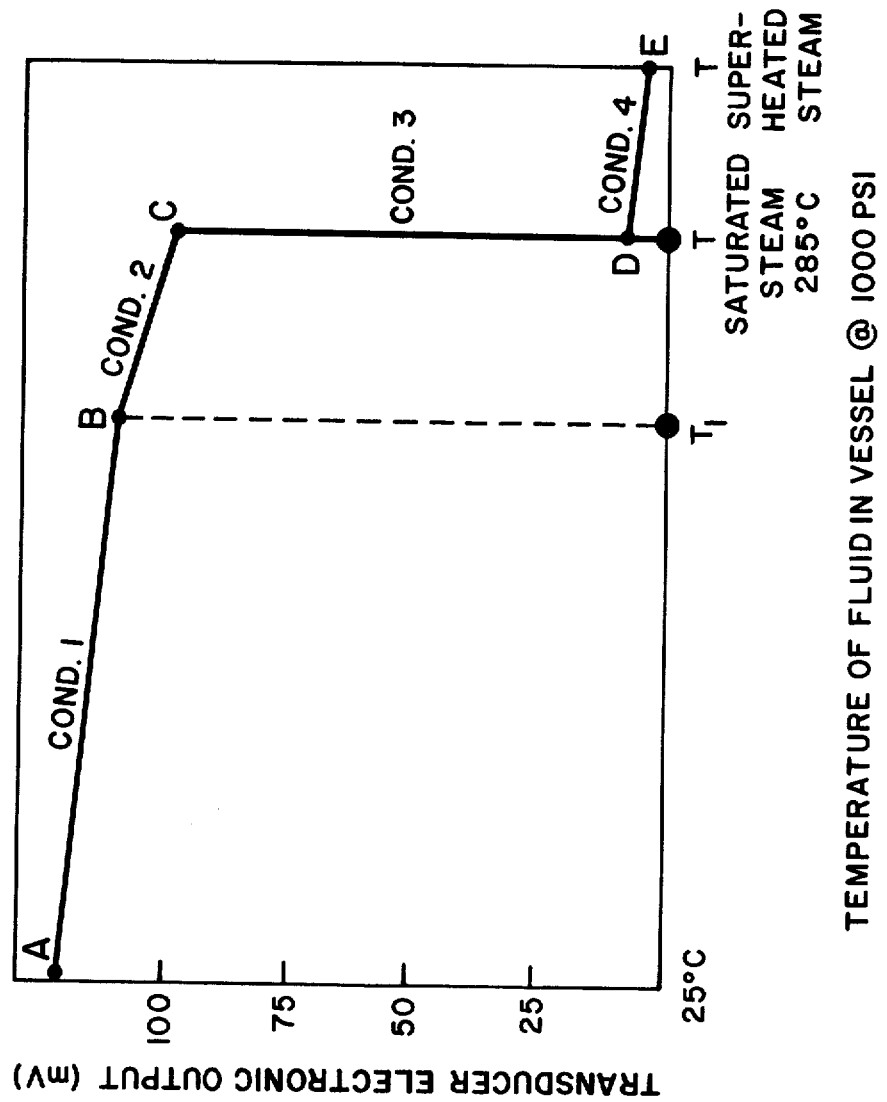
FIG. 2 Graphically illustrates transducer output for various fluid conditions within a vessel.

There are four distinct states of operation of the sensing system as shown in FIG. 2 and their applicability to reactor operation varies with the type of reactor. Condition one on FIG. 2 represents the output of the sensor from the time the reactor primary loop is pressurized sufficiently to drive the sensor (point A) until point B is reached. The slope of the output during this portion is linear and is controlled by the density (temperature) of the fluid. Condition 2 begins at a fluid temperature shown as T1 (point B). This fluid temperature point will vary as a function of the orifice size, the pressure drop in the sensing system and on the temperature and pressure of the fluid. However for any given design the point is a finite temperature. Sensor output during the phase defined as condition 2 (point B to C) is a function of the change in density of the fluid because of increasing temperature but is modified by the fluid flashing to vapor after it passes through the first orifice 4. This phase will be non linear and distinguished from the generalized slope of condition 1 & 3.

The condition shown as three in FIG. 2 (Point C to D) represent the sensor output when a liquid level occurs without a void fraction being present. During this condition the fluid temperature and density remain at Tsaturated through the first orifice and the pressure drop at the transducer is trying to go to Point C or Point D. The device then operates as a switch. Point D on FIG. 2 represents a liquid level. This point is defined by the two orifices used in the instrument design and the pressure drop in the system. If the sensing system is located outside the reactor core the steam temperature will not go above Tsaturated and the output of the sensor will remain at point D.

However, if the sensor is in the reactor core the steam can exceed Tsaturated and become superheated. This would drive the sensor output into condition four (points D to E). In this event condition 4 represents a definable readout which can be related to the temperature of the superheated vapor at the sensing location. Further by reducing the size of the second orifice for this condition, the points D & E can be moved up on the graph and definitive output is obtained which represents the changing mass flow rate as the vapor temperature increases. This output can be calibrated to read directly as vapor temperature. The upper limit of the instrument is only limited by the ability of the direct contact portion of the instrument to survive the temperature and flow conditions in the environment. Materials are known which would allow this vapor temperature measurement to be made at 2100K. Other ceramics are likely to be available now or in the future to increase this upper limit to well beyond this temperature.

Referring now to FIG. 1, the back pressure regulator controls the pressure drop across both orifices at a design value (i.e., 200 psi). The orifices are sized so that in this first condition each orifice drops 100 psi and neither is in critical flow. In the liquid condition then the differential pressure transducer reads 100 psi. A second condition exists when the liquid is below the pickup line level. The space above the liquid is filled with saturated steam. In this condition the first orifice sees saturated steam. Because the second orifice is downstream of the condensing coil it always sees liquid. Meanwhile the steam passing through the first orifice is being cooled and condensed before it reaches the second orifice. This condensation and resultant reduction in volume adds to the driving force for flow through the first orifice, therefore the pressure drop in the first orifice increases. Because the two orifices are in series the pressure drop in the second orifice decreases. This is the sensing orifice and the differential pressure transducer output drops. Calculations for above stated conditions show this will drop to approximately 6 psi. The mass flow rate in the line will decrease by 3.5 or more. These two described conditions represent the device operating as a liquid level sensor.

The two conditions above represent the bounding conditions of void fraction or two-phase flow. The third condition of operation of this device is when the input flow to orifice one is a void fraction. By definition, the sensing orifice must develop an output differential pressure which is between its output during condition one and its output during condition two. The void fraction sensing aspect of this device then provides an output which is a smoothly varying (but not necessarily linear) over the entire range of void fraction, since void fraction only exists between the liquid and the saturated steam conditions.

Figure 3:
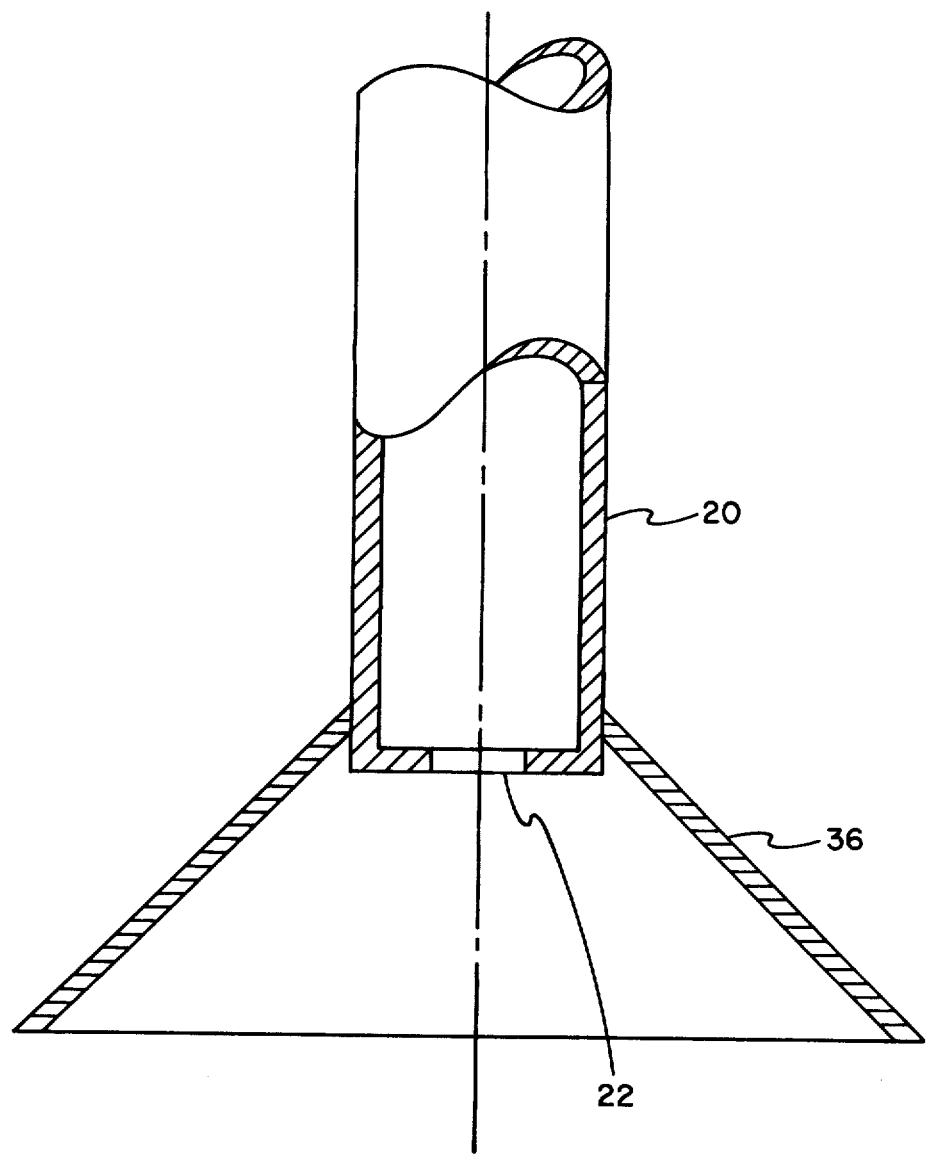
FIG. 3 illustrates a modified tubing configuration for use with the invention.

This basic device can be utilized with a minor modification to provide selective amplification of a given segment of two phase flow. Referring to FIG. 3, the end of the tube 20 has been modified by increasing the surface area with a bell or umbrella attachment 36. In the configuration shown, this addition serves to catch more vapor bubbles than the device as shown in FIG. 1. Since the measurement system output relates directly to the ratio of vapor to liquid collected by the orifice, we can amplify the perceived void fraction by collecting more vapor than is representative of the actual void fraction that exists. This then allows the very low void fraction area (nucleate boiling) to provide full scale readout in the sensing device. When this is done, an actual void fraction ranging between 0 and say 2% can be made to look like a void fraction of 0 to say 100%.

By turning the bell and pickup orifice upside down, one could collect entrained moisture (droplets) from steam in the same way. That is, collecting enough droplets at say 80% void fraction to make the sensor read 0% void fraction when the sensing orifice sees a void fraction of 80%. The sensor then reads from 0 to 100% when the steam goes from 80 to 100%. The device with input amplification becomes highly useful in research applications as well as measuring the quality of steam and other vapors. For example in the steam generator side of a power plant.

It is also possible to obtain an output signal indicative of the void fraction flowing through the first orifice by sensing the position of the valve in the back pressure regulator said herein, "void fraction" shall refer to the volume ratio of steam vapor to liquid co-existing at a finite location. For liquid, the void fraction is zero and for saturated steam conditions, the void fraction is 100%.

Practical utilization of this system in a reactor requires space availability, as well as physical access into the vessel and associated piping. Current design of boiling water and pressurized water reactors have sufficient vertical space in their cores for ten to eighteen sensing lines comprising lengths of tubing as generally discussed. It appears practical to transition such lines out of the vessel through the existing borate injection standpipe or other possible locations, such as flange fittings.

The liquid flow from the reactor vessel, even though accomplished through a large number of lines, represents only a small total flow in relation to the liquid volume of the coolant loop. While the described system requires a high pressure collecting tank or reservoir 32 and a reinjection pump 34 to direct liquid back into the primary coolant/loop, such equipment poses no significant practical problems.

The normal flow in an exemplary tube 20 comprising 1/32 in. inside diameter tubing would total 34 gallons per day in a boiling water reactor installation of conventional design. Unless a very large number of lines were utilized in a single system, the collection reservoir 32 and makeup pump 24 would be very small. A preferred system would be designed so as to accommodate nominal flow of 0.5 gallons per minute per line.

The flow out of a broken line poses no problem since the water will flash to steam in the line. Choked flow for the proposed 1/32 in. inner diameter line is equal to two gallons per day. The severity of this problem is minimal even if a very large number of lines were to be used and multiple breaks were to occur.

The response time of this device is nearly instantaneous. This is because the pressure drop seen at the first orifice is transmitted to the second orifice (sensor) at or near the speed of sound. In addition, should slug flow through orifice one result in noise, these pressure pulses would to some extent be damped out before reaching the second orifice, thereby reducing or smoothing the output signal.

I claim:

1. An apparatus for monitoring coolant within a nuclear reactor vessel having a pressurized circulating liquid coolant loop, said apparatus comprising:
   tubing means having an open end with a first restriction means positioned within the vessel, said tubing means leading through the vessel for delivering pressurized coolant from its open end to the vessel exterior;
   second restriction means operably interposed between the open end of the tubing means and said pump means for causing a pressure drop in coolant drawn along the length of the tubing means; and
   sensing means connected across said second restriction means for providing an output signal as a function for the pressure drop of the coolant across the second restriction means;
   wherein said first and second restriction means are arranged in series along said tubing means.

2. An apparatus as set out in claim 1 wherein said restriction means comprises a venturi throat or an orifice.

3. An apparatus as set out in claim 1 further comprising:
   valve means interposed in said tubing means between the second restriction means and the pump means; for controlling flow of liquid across the valve means and maintaining the pressure at the downstream side of said second restriction means at a preselected ratio to the pressure of the liquid coolant circulated within the loop.

4. An apparatus as set out in claim 1, further comprising:
   valve means interposed in said tubing means between the second restriction means and the pump means for controlling flow of liquid across the valve means and maintaining the pressure at the downstream side of said restriction means at a preselected ratio to the pressure of the liquid coolant circulated within the loop; and
   cooling means operably provided about the exterior of said tubing means upstream said second restriction means for condensing coolant within the tubing means to a liquid phase upstream of the tubing means.

5. An apparatus as set out in claim 1 wherein the tubing means comprises a multiple number of tubes having individual open ends at differing incremental elevations;
   each tube having independent second restriction means and sensing means.

6. An apparatus as set out in claim 1 wherein first restriction means comprises a number of orifices within a single tube.

* * * * *